United States Patent
Fukui et al.

(12) 
(10) Patent No.: US 6,639,163 B2
(45) Date of Patent: Oct. 28, 2003

(54) TOUCH PANEL

(75) Inventors: Toshiharu Fukui, Nara (JP); Hiroshi Moroi, Osaka (JP)

(73) Assignee: Matsushita Electric Industrial, Co., Ltd., Osaka (JP)

( * ) Notice: Subject to any disclaimer, the term of this patent is extended or adjusted under 35 U.S.C. 154(b) by 0 days.

(21) Appl. No.: 10/053,607

(22) Filed: Jan. 24, 2002

(65) Prior Publication Data

US 2002/0100677 A1 Aug. 1, 2002

(30) Foreign Application Priority Data

Jan. 26, 2001 (JP) ........................................ 2001-018156

(51) Int. Cl.[7] ............................................... H01W 1/10
(52) U.S. Cl. ........................................ 200/512; 200/600
(58) Field of Search ................................. 200/600, 511, 200/512, 514; 345/173; 178/18.09

(56) References Cited

U.S. PATENT DOCUMENTS

| | | | | |
|---|---|---|---|---|
| 4,423,299 A | * | 12/1983 | Gurol et al. ................ | 200/512 |
| 4,672,153 A | * | 6/1987 | Kikuchi .................... | 178/18.09 |
| 4,700,025 A | * | 10/1987 | Hatayama et al. .......... | 200/5 A |
| 4,901,074 A | * | 2/1990 | Sinn et al. .................... | 341/22 |
| 4,954,673 A | | 9/1990 | Miller ...................... | 200/61.43 |
| 4,965,421 A | * | 10/1990 | Epperson .................... | 200/514 |
| 5,179,460 A | * | 1/1993 | Hinata et al. ............... | 349/149 |
| 5,973,282 A | | 10/1999 | Takemori et al. ........... | 200/512 |
| 6,380,497 B1 | * | 4/2002 | Hashimoto et al. ......... | 200/5 A |

* cited by examiner

*Primary Examiner*—Michael Friedhofer
(74) *Attorney, Agent, or Firm*—Wenderoth, Lind & Ponack, L.L.P.

(57) ABSTRACT

A touch panel has excellent visibility and little waviness on respective elements even if the touch panel is exposed in a severe temperature or moisture environment. The touch panel includes an upper electrode sheet and a lower electrode board having respective transparent electrodes face to each other, and both of the sheet and the board are made of respective materials containing an identical main component to each other. In the touch panel, differences in dimensional changes due to the severe environment are restrained so as to be small. Therefore, waviness on the upper electrode sheet and warp of the lower electrode board scarcely occur, and the touch panel can maintain excellent visibility.

11 Claims, 5 Drawing Sheets

TOUCH PANEL

FIELD OF THE INVENTION

The present invention relates to a touch panel to be placed on a screen of a liquid crystal display (LCD) or a cathode ray tube (CRT). The touch panel is used for inputting a position following an instruction displayed on the screen and viewed through the touch panel. The position is input through a user pressing the panel with a finger or pen.

BACKGROUND OF THE INVENTION

Recently, a compact and lightweight portable terminal has been popular in the market, and a touch panel, which is used as an input device of the terminal, is required to be compact and lightweight. Further, the touch panel is required to be free from inconvenience even if the terminal is carelessly dropped.

Resistive touch panels have been widely used among the touch panels because the resistive touch panel has rather high detecting accuracy and can be manufactured at an inexpensive cost, and numbers of the touch panels are formed by combining plastic materials.

Figure 4:
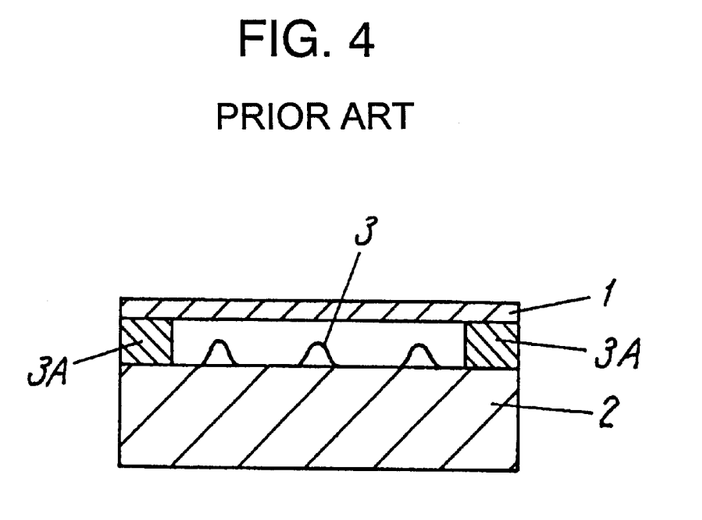
FIG. 4 is a sectional view of a conventional touch panel.

The conventional touch panel discussed above is described hereinafter with a relevant drawing. FIG. 4 is a sectional view of the conventional touch panel. The touch panel includes the following elements:

(a) An upper electrode sheet 1 including a flexible transparent film and a transparent electrode disposed on one of the faces of the sheet 1, the electrode being made of indium tin oxide (ITO) and the like;

(b) A lower transparent plastic board 2 having a transparent electrode;

(c) An insulating spacer 3A disposed on the periphery of both of the sheet 1 and board 2 for the transparent electrodes to face each other at a given distance; and (d) A conical spacer 3, made of soft insulating material, disposed like dots at a given pitch on the transparent electrode of the lower-transparent-plastic board 2.

The conventional touch panel is usually placed on a screen of an LCD or a CRT, and an operator, who views an instruction displayed on the screen through the touch panel, presses the upper electrode sheet 1 at a given position from above with his/her finger or a pen. This action entails the upper electrode sheet 1 to bow downward partially, and the bowed portion of sheet 1 thus contacts with a corresponding portion of the transparent electrode disposed on the lower plastic board 2, so that the pressed position can be detected.

The transparent film of the upper electrode sheet 1 is usually made of polyethylene terephthalate because it is inexpensive and flexible enough for the input operation, and further, the ITO, which is formed on one of the faces of the film, is stabilized easily. The lower board 2 is usually made of polycarbonate because this material is inexpensive, highly transparent and processed easily.

Figure 5:
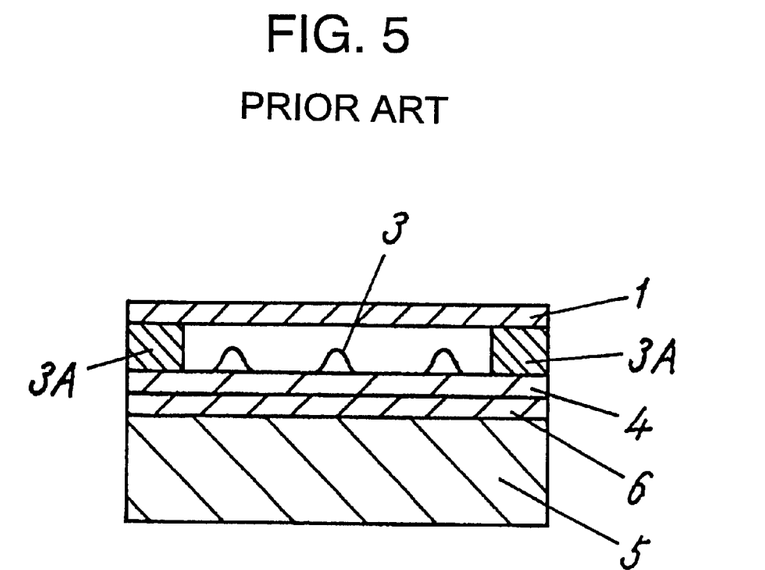
FIG. 5 is a sectional view of another conventional touch panel.

Another conventional touch panel is shown in FIG. 5. This touch panel includes the following elements:

(a) An upper electrode sheet 1 including flexible transparent film and a transparent electrode disposed on one of the faces of sheet 1, the electrode being made of indium tin oxide (ITO) and the like;

(b) A lower electrode sheet 4 having a transparent electrode;

(c) An insulating spacer 3A disposed on the periphery of both sheets 1 and 4 for the transparent electrodes to face each other at a given distance;

(d) A transparent holder board 5 made of a rigid transparent plastic board and disposed under the lower face of the sheet 4, where no electrode is formed;

(e) A transparent bonding layer 6 for bonding the board 5 to the sheet 4; and (f) A conical spacer 3, made of soft insulating material, disposed like dots at a given pitch on the transparent electrode of the lower board 2.

This touch panel operates similarly to the panel shown in FIG. 4 previously described, i.e., the touch panel is placed on a screen, and an operator presses the upper electrode sheet 1 at a given position from above. This action entails the upper electrode sheet 1 to bow downward partially, and the bowed portion of sheet 1 thus contacts with a corresponding portion of the transparent electrode disposed on the lower plastic board 2, so that the pressed position can be detected.

In this touch panel, the electrode sheets 1 and 4 are made of polyethylene terephthalate, and the holder board 5 is made of polycarbonate because of the same reason discussed above.

Both of the conventional touch panels discussed above employ polyethylene terephthalate combined with polycarbonate. These two materials are largely different in coefficients of linear expansion. Therefore, when the touch panel is exposed in a severe temperature or moisture environment, dimensions of members of the panel change differently from each other, which may cause waviness, i.e., distortion on the film, particularly in the case that the film is thin. This phenomenon lowers visibility of the touch panel and makes the distance between the upper and lower transparent electrodes narrower if the waviness is large, thus causing an unexpected short between both of the electrodes.

SUMMARY OF THE INVENTION

A reliable touch panel of the present invention features the following advantages. Even when being exposed in a severe temperature or moisture environment, the touch panel does not has waviness produced on an upper or lower electrode sheet. The panel thus hardly has the electrodes short-circuit and maintains excellent visibility.

The touch panel includes a transparent film, an upper electrode sheet having a first transparent electrode disposed on the transparent film, and a lower electrode board having a rigid transparent plastic board and a second transparent electrode. The second transparent electrode is disposed on the transparent plastic board and faces the first transparent electrode. The first transparent film and the transparent plastic board are made of respective materials containing an identical main component to each other.

DESCRIPTION OF THE PREFERRED EMBODIMENTS (Exemplary Embodiment 1)

Figure 1:
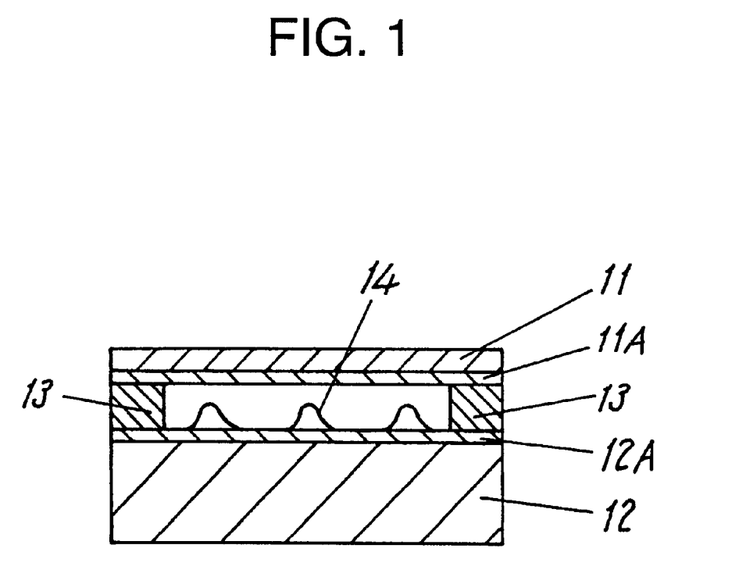
FIG. 1 is a sectional view of a touch panel in accordance with a first exemplary embodiment of the present invention.

FIG. 1 is a sectional view of a touch panel in accordance with a first exemplary embodiment of the present invention.

An flexible upper electrode sheet 11 includes a transparent electrode 11A which is made of indium tin oxide (ITO) and the like and is formed beneath the lower face of a rectangular transparent film. A lower electrode board 12 includes a transparent plastic board shaped substantially the same as the upper electrode sheet 11 and a transparent electrode 12A formed on the plastic board. Between the upper electrode sheet 11 and lower electrode board 12, an insulating spacer 13 having a given width is disposed at the periphery of the sheet 11 and board 12. Thus, the electrodes 11A and 12A face each other at a given space.

In the drawings corresponding to this embodiment, respective thicknesses of the electrodes 11A and 12A are depicted exaggeratedly for an articulation purpose.

The transparent film, a base material of the upper electrode sheet 11, is made of a polycarbonate film. The lower electrode board 12 is made of a material containing an identical main component and an identical structure to that of the upper electrode sheet 11, and a different functional group than the sheet 11. Both materials contain the identical main component to each other and the different functional groups bonded with the component for allowing the sheet 11 and board 12 to be processed most appropriately, respectively.

The transparent plastic board, a base material of the lower electrode board 12, employs the same material as the upper electrode 11, i.e., a polycarbonate board of thickness of 0.5–2.0 mm.

On the transparent electrode 12A in the area surrounded by the spacer 13, conical spacers 14 formed of flexible insulating material are disposed like dots at a given pitch.

The upper electrode sheet 11 may have a hard-coated layer on the face opposite to the face having the electrode 11A. The hard-coated layer is made of thermosetting resin such as acrylic epoxy resin or urethane resin, or photo-curable resin of acrylate resin. The electrode sheet 11 is formed through forming the transparent electrodes 11A sequentially on a raw rolled film and cutting the film at a given interval to be the sheet 11.

The touch panel discussed above is placed on the screen of an LCD or a CRT. An operator, who views an instruction displayed on the screen through the touch panel, depresses and bows the upper electrode sheet 11 at a particular portion with his/her finger or a pen following the instruction. The electrodes 11A and 12A corresponding to bowed portion of the upper electrode sheet 11 and lower electrode board 12 thus contact with each other, thereby detecting the depressed position.

The depressed position is detected by the following way. While the transparent electrode 11A has opposing edges to which a certain voltage is applied, a voltage at the position is detected, and a corresponding position between the opposing edges is thus detected. Then, the certain voltage is released from the edges. Then, while the transparent electrode 11A has other opposing edges to which a certain voltage is applied, a voltage at the position is detected, and a corresponding position between the other opposing edges is thus detected similarly to the above.

Since being made of the respective materials containing the identical main component, the sheet 11 and board 12 of the touch panel in accordance with this first embodiment have respective dimensions that differ very little from each other even in a severe temperature or moisture environment. Therefore, the upper electrode sheet 11 hardly has waviness, the lower electrode board 12 can have reduced warp, and the touch panel thus maintains high visibility. The reduced waviness and warp eliminate an unexpected short-circuit between the electrodes 11A and 12A, thus allowing the touch panel to have stable quality. A portable electronic apparatus with this touch panel can thus be operated even in a critical environment.

The sheet 11 and board 12 discussed above are made of polycarbonate resin, however, they may be made of alicyclic olefin resin. This alicyclic olefin resin, since having a higher light-transmission and a higher heat-resistance than the polycarbonate resin, produces less dimensional differences of respective elements even in an ambient temperature or environment. As a result, this alicyclic olefin resin easily provides a touch panel having a high light-transmission and an excellent visibility. The alicyclic olefin resin, since featuring a low double-refraction, provides an inner touch panel having excellent visibility.

Versatile material such as polyether sulphone resin or polyarylate can be used as the base material of the upper electrode sheet 11 and the lower electrode board 12. In this case, a high quality touch panel is also obtainable.

The sheet 11 and board 12 are not necessarily made of the same material, but can be made of different materials as far as the materials have only a small difference in linear-expansion coefficients. In this case, the same advantage as discussed previously can be expected.

A resistive touch panel is usually guaranteed to work properly within a temperature ranging from $-20°$ C. to $+70°$ C. The upper electrode sheet 11 having a thickness of approximate 170 $\mu$m and a length of one side not more than 80 mm is widely used. Based on these factors, upon being made of the materials having a difference in coefficients of linear expansion of not more than $1 \times 10^{-5}(1/° \text{C.})$, the sheet 11 and board 12 have the dimensional difference between respective changes within the guaranteed temperature range regulated to not more than 40 $\mu$m, i.e., approximately one third of the thickness of the sheet 11. As a result, waviness on the sheet 11 and warp of the board 12 are reduced, so that the panel maintains excellent visibility.

In the above discussion, the sheet 11 is made of a sheet of a transparent film. However, as shown in sectional view of FIG. 2, an upper electrode sheet 31 may be formed of two thin transparent films 33A, 33B bonded to each other with a transparent adhesive 32 and a transparent electrode 31A disposed beneath the film 33B at the side where no film 33A is bonded.

Figure 2:
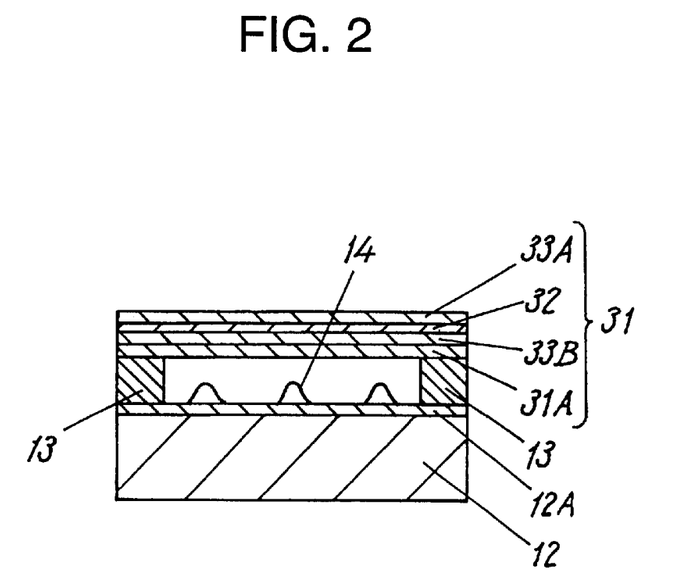
FIG. 2 is a sectional view of another touch panel having an upper electrode sheet different from that of the touch panel shown in FIG. 1 in accordance with the first exemplary embodiment.

In this case, the thin transparent films 33A, 33B and the lower electrode board 12, upon being made of the same material or materials having differences in linear-expansion coefficients not more than $1 \times 10^{-5}(1/° \text{C.})$, can also provide a quality touch panel having an excellent visibility similarly to the previously discussed panel. In this case, the upper electrode sheet 31 becomes more flexible, and thus, the place around the spacer 13 on the upper sheet 31 can be depressed more easily than other cases discussed above. The more flexible sheet 31 also contributes to the touch panel with light-touch operation and durability.

(Exemplary Embodiment 2)

Elements similar to those in the first embodiment are denoted by the same reference marks as those in the first embodiment, and the descriptions thereof are thus omitted.

Figure 3:
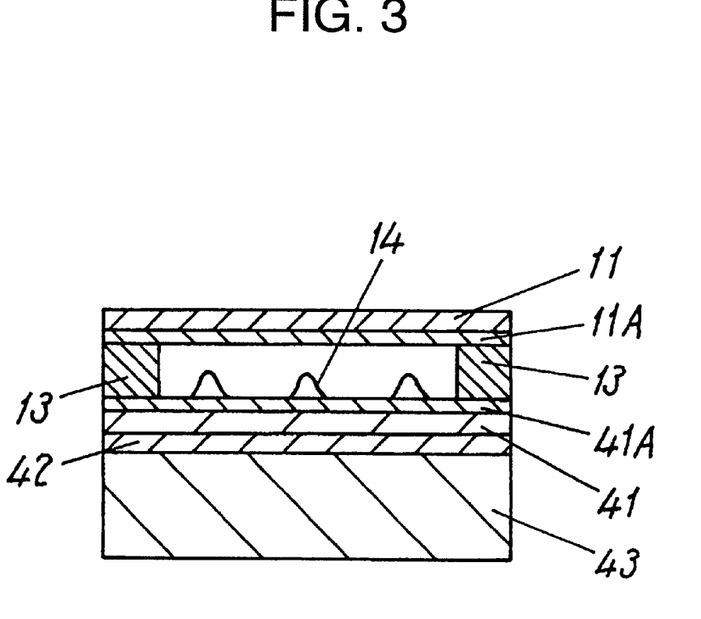
FIG. 3 is a sectional view of a touch panel in accordance with a second exemplary embodiment of the present invention.

FIG. 3 is a sectional view of a touch panel in accordance with the second embodiment of the present invention. An upper electrode sheet 11 includes a transparent film shaped approximately as a rectangle and a transparent electrode 11A disposed beneath the lower face of the film. The lower electrode sheet 41 includes a transparent film shaped in approximately the same form and a transparent electrode 41A disposed on the upper face of this film. The sheet 11 and sheet 41 are formed of the same transparent film such as polycarbonate film or alicyclic olefin film. A spacer 13 is formed at a given width around the sheet 11 and sheet 41, and thus, the transparent electrodes 11A and 41A face each other at a given space.

In the drawing corresponding to the second embodiment, the thickness of electrodes 11A, 41A are exaggeratedly illustrated for an articulation purpose similar to the first embodiment.

On the transparent electrode 41A of the area surrounded by the spacer 13, conical spacers 14 formed of flexible insulating material are disposed like dots at given pitch.

Beneath the lower face of the sheet 41, where electrode 41A is not formed, a transparent holder board 43 is solidly bonded via a transparent adhesive layer 42. The holder board 43, which has a thickness of 0.5–2.0 mm, is formed of a transparent rigid plastic board made of a material containing an identical main component to that of the sheet 11 and sheet 41.

The transparent holder board 43, the upper electrode sheet 11, and the lower electrode sheet 41 are made of respective materials containing an identical main component and an identical structure to each other, and different functional groups than each other. That is, the materials belong to an identical resin group. The transparent adhesive layer 42 preferably contains, as a main component, acrylate resin, polyester resin, or mixture of them, and has an elastic coefficient ranging $1 \times 10^5 - 1 \times 10^7$ dyn/cm$^2$ and a thickness of not less than 1 μm.

The touch panel in accordance with the second embodiment is placed on a screen on an LCD or a CRT similar to the first embodiment. An operator, who views an instruction displayed on the screen through the touch panel, depresses and bows the upper-electrode sheet 11 at a particular portion with his/her finger or a pen following the instruction. A specific portion corresponding to the bowed portion of the electrodes 11A and 41A of the upper electrode sheet 11 and the lower electrode sheet 41 contact with each other, thereby detecting the depressed position.

The position may be detected similar to embodiment 1.

The transparent adhesive layer 42 between the sheet 41 and board 43 functions as a shock absorber when the upper sheet 11 is depressed, and thereby, protects the sheets 11, 41 and the electrodes 11A, 41A. As a result, the touch panel has an improved durability.

The touch panel in accordance with this second embodiment employs the same base material group in the upper and lower sheets 11, 41 and the holder board 43, namely, each element has the same linear-expansion coefficient. Therefore, even if the touch panel is exposed in a severe temperature or moisture environment, the touch panel has elements having little difference in dimensional changes, and has reduced stresses due to the changes between the elements. Waviness on the sheets 11, 41 and warp of the holder board 43 are thus scarcely produced. As a result, a quality touch panel with excellent visibility and free from an unexpected short-circuit between the electrodes 11A and 41A is obtainable.

As discussed in the first embodiment, the upper sheet 11, lower sheet 41 and holder board 43 are not necessarily made of the same material. They can be made of different materials as far as the materials have differences in the linear-expansion coefficient of not more than $1 \times 10^{-5}(1/^\circ C.)$. Then, the touch panel produces the advantage similar to the panel discussed previously.

The upper electrode sheet 11 may have a hard-coated layer disposed on the face opposite to that having the electrode 11A, as discussed in the first embodiment. Further, the sheet 11 can be formed of two transparent films bonded to each other.

What is claimed is:

1. A touch panel comprising:
   a first electrode sheet including:
      a first transparent film; and
      a first transparent electrode disposed on said first transparent film; and
   an electrode board including:
      a rigid transparent plastic board; and
      a second transparent electrode disposed on said plastic board, said second transparent electrode facing said first transparent electrode,
   wherein said first transparent film and said rigid transparent plastic board are made of respective materials containing an identical main component to each other.

2. The touch panel of claim 1, wherein said first transparent film includes:
   two transparent films; and
   an adhesive bonding said two transparent films to each other.

3. A touch panel comprising:
   a first electrode sheet including:
      a first transparent film; and
      a first transparent electrode disposed on said first transparent film; and
   an electrode board including:
      a rigid transparent plastic board; and
      a second transparent electrode disposed on said plastic board, said second transparent electrode facing said first transparent electrode,
   wherein a difference between respective linear-expansion coefficients of said first transparent film and said rigid transparent plastic board is not more than $1 \times 10^{-5}(1/^\circ C.)$.

4. The touch panel of claim 3, wherein said first transparent film includes:
   two transparent films; and
   an adhesive bonding said two transparent films to each other.

5. A touch panel comprising:
   a first electrode sheet including
      a first transparent film; and
      a first transparent electrode disposed on said first film;
   a second electrode sheet including
      a second transparent film; and
      a second transparent electrode disposed on said second film, said second transparent electrode facing said first transparent film; and
   a holder board disposed on a face, where said second transparent electrode is not disposed, of said second electrode sheet, said holder board being made of a rigid transparent plastic board,
   wherein said first transparent film, said second transparent film and said holder board are made of respective materials containing an identical main component to each other.

6. The touch panel of claim 5, further comprising:
   a transparent adhesive layer for bonding said second electrode sheet to said holder board.

7. The touch panel of claim 5, wherein said first transparent film includes:
   two transparent films; and
   an adhesive for bonding said two transparent films to each other.

8. A touch panel comprising:

a first electrode sheet including:
  a first transparent film; and
  a first transparent electrode disposed on said first transparent film;

a second electrode sheet including:
  a second transparent film; and
  a second transparent electrode disposed on said second transparent film, said second transparent electrode facing said first transparent film; and a holder board disposed on a face, where said second transparent electrode is not disposed, of said second electrode sheet, said holder board being made of a rigid transparent plastic board, wherein a difference between respective linear-expansion coefficients of said first transparent film and said holder board is not more than $1 \times 10^{-5}(1/^\circ$ C.), wherein a difference between respective linear-expansion coefficients of said second transparent film and said holder board is not more than $1 \times 10^{-5}(1/^\circ$ C.), and wherein a difference between respective linear-expansion coefficients of said first transparent film and said second transparent film is not more than $1 \times 10^{-5}(1/^\circ$ C.).

9. The touch panel of claim 8, wherein said first and second transparent films are made of an identical material.

10. The touch panel of claim 8, further comprising:
  a transparent adhesive layer for bonding said second electrode sheet to said holder board.

11. The touch panel of claim 8, wherein said first transparent film includes:
  two transparent films; and
  an adhesive for bonding said two transparent films to each other.

* * * * *

UNITED STATES PATENT AND TRADEMARK OFFICE
CERTIFICATE OF CORRECTION

PATENT NO. : 6,639,163 B2
DATED : October 28, 2003
INVENTOR(S) : Toshiharu Fukui et al.

It is certified that error appears in the above-identified patent and that said Letters Patent is hereby corrected as shown below:

<u>Column 6,</u>
Line 39, please replace "adhesive bonding" with -- adhesive for bonding --.

Signed and Sealed this

Third Day of February, 2004

JON W. DUDAS
*Acting Director of the United States Patent and Trademark Office*